P. A. MYERS.
HAY RACK.
APPLICATION FILED JAN. 19, 1914.
1,113,469.
Patented Oct. 13, 1914.
2 SHEETS—SHEET 1.
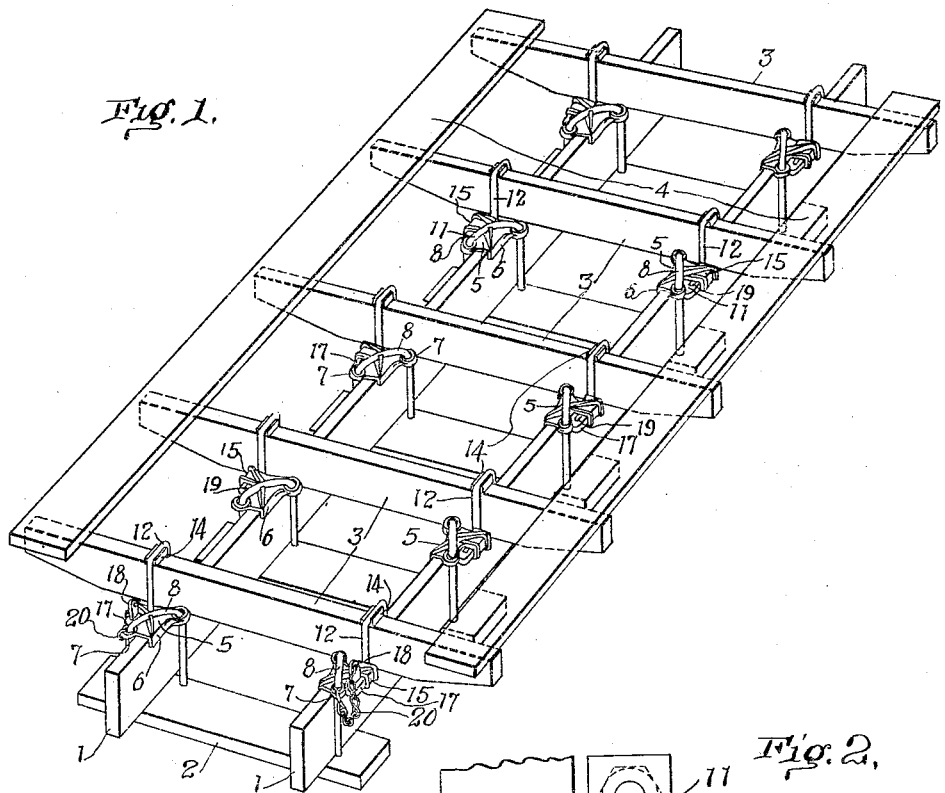
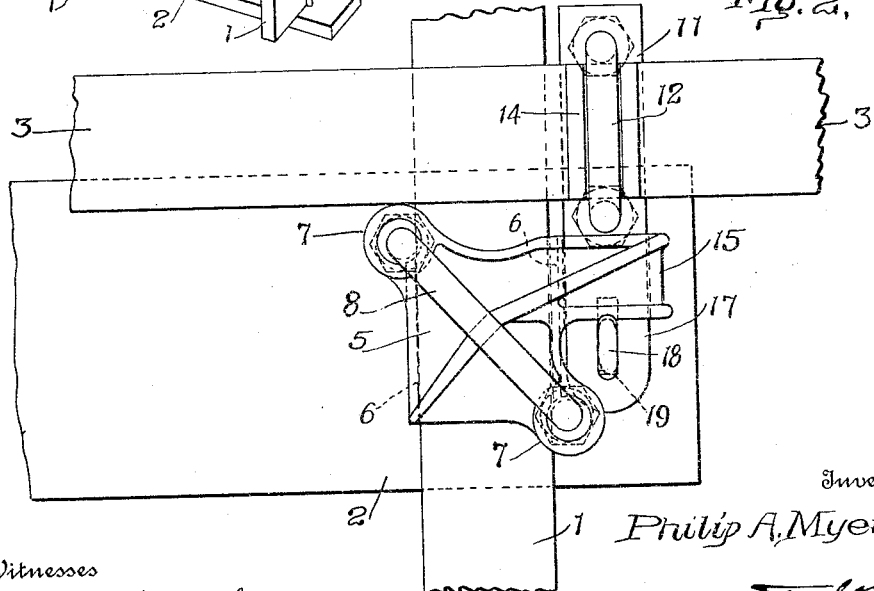
Inventor
Philip A. Myers.
Witnesses P. A. MYERS.
HAY RACK.
APPLICATION FILED JAN. 19, 1914.
1,113,469.
Patented Oct. 13, 1914.
2 SHEETS—SHEET 2.
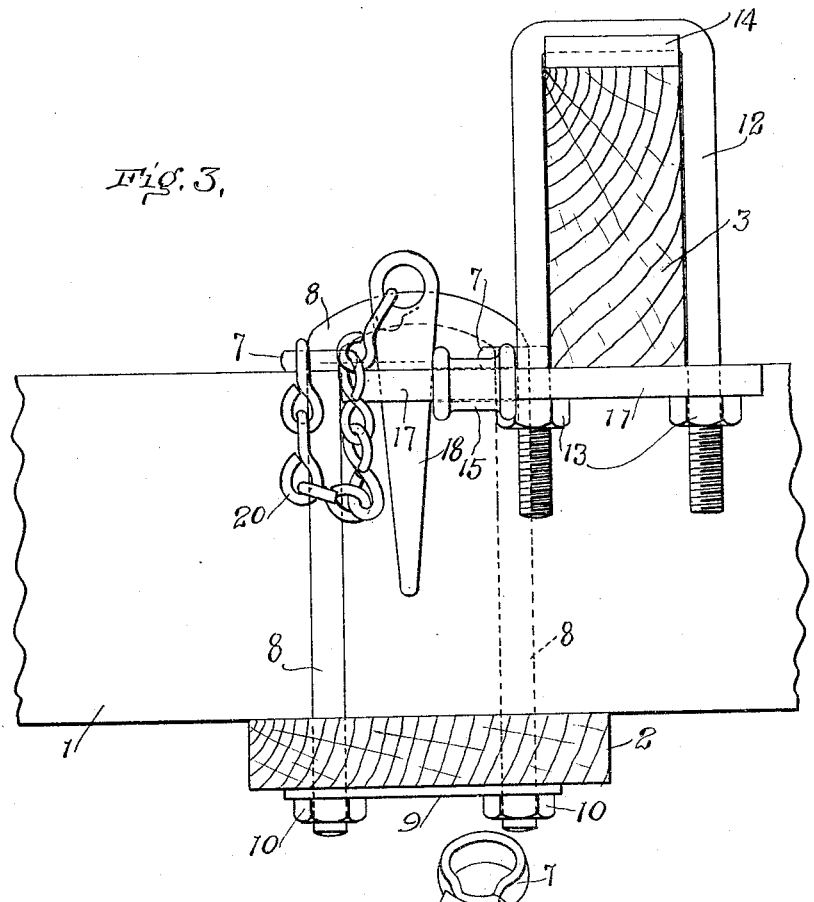
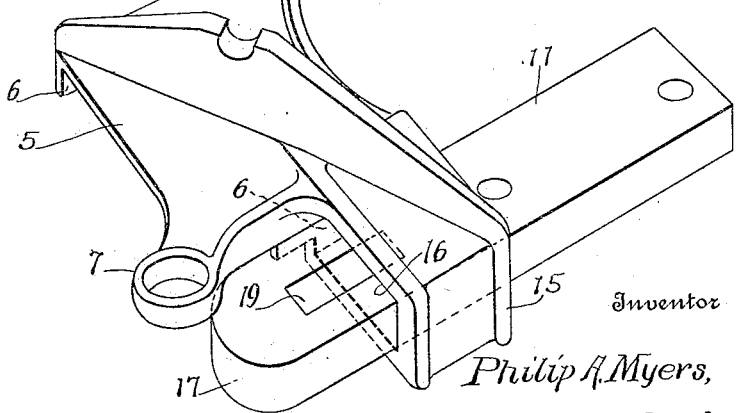

UNITED STATES PATENT OFFICE.

PHILIP A. MYERS, OF ASHLAND, OHIO, ASSIGNOR TO F. E. MYERS AND BROTHER, OF ASHLAND, OHIO, A COPARTNERSHIP.

HAY-RACK.

1,113,469.  Specification of Letters Patent.  Patented Oct. 13, 1914.

Application filed January 19, 1914. Serial No. 812,884.

*To all whom it may concern:*

Be it known that I, PHILIP A. MYERS, a citizen of the United States, residing at Ashland, in the county of Ashland and State of Ohio, have invented certain new and useful Improvements in Hay-Racks, of which the following is a specification, reference being had therein to the accompanying drawing.

This invention relates to hay racks and more particularly to the connecting devices or clamping brackets which are utilized for connecting together the upper and lower portions of the rack.

Hay racks as commonly constructed consist of a lower longitudinal supporting portion comprising parallel sills and a wide upper load-supporting portion comprising transverse members extending across and secured to the sills. It has been proposed heretofore to connect together the upper and lower portions of the rack by means of clamping devices which would clamp the transverse members of the upper portion to the longitudinal sills without the necessity of boring any of these members for the reception of bolts, thereby not only facilitating the construction of the rack but preserving the full strength of the members. Connecting devices for this purpose are shown in Patent No. 792,064 granted to me June 13, 1905. It is desirable that the upper and lower members should be separable one from the other for, at least, two reasons. First, the rack as a whole is very heavy and unwieldy and is more than one man can readily handle in placing it on or removing it from the wagon. When the upper and lower portions of the rack are separated, the size and weight of the two parts thereof, and particularly the upper portion thereof, are such that it can be readily removed from or placed on the wagon by one man working alone. The second reason for making the upper portion separable from the lower portion is that in many cases it is desired to substitute a wide flat wagon-bed for the load-supporting portion of the hay rack, this bed utilizing the same supporting sills which are used for the rack. My former patent, above mentioned, discloses the broad idea of separable upper and lower portions but to remove the upper portion from the lower portion of the rack there shown it was necessary to remove sixteen nuts from their respective bolts and to remove the eight clamping devices from the transverse members of the upper part of the rack. This was objectionable for various reasons. It required the use of a wrench. It required a great deal of time and when the parts were separated the detached clamps and nuts were readily misplaced and lost, causing much annoyance.

The object of the present invention is to provide connecting devices for the longitudinal and transverse members of a hay rack which will permit these members to be readily separated one from the other and to this end it is a further object of the invention to provide connecting devices, each of which will comprise separable members, which members are connected respectively with the transverse and longitudinal members of the rack.

It is a further object of the invention to provide means for locking together the separable members of the connecting device, which locking means will be of such a character as to permit it to be very quickly and readily manipulated without tools.

In the accompanying drawings, Figure 1 is a perspective view of a hay rack embodying my invention; Fig. 2 is a top, plan view of one of the connecting devices showing the same applied to the intersecting members of the rack; Fig. 3 is a side elevation of the connecting device applied to the intersecting members; and Fig. 4 is a detail view of the separable members forming parts of the connecting device.

In carrying out my invention I have provided a connecting device consisting of two parts, each part being so constructed that it can be permanently attached to one of the intersecting members of the hay rack. The two members of the connecting device are so constructed that they can be readily connected with and disconnected from one another, they preferably having interlocking parts which can be placed in interlocking position and fastened in that position by the use of a very simple locking device. To separate the two parts of the rack it is only necessary to remove the locking device, shift the upper portion of the hay rack to disengage the interlocking parts of the connecting device and then remove the upper portion of the rack. The connecting device may be constructed in various ways to obtain these results.

In the accompanying drawings I have illustrated one embodiment of my invention and have shown therein one form of connecting device which is very satisfactory and which serves to illustrate the invention. As shown in these drawings the hay rack comprises the usual longitudinal sills 1, connected one to the other by cross pieces 2 and adapted to rest upon the bolsters of an ordinary wagon. Mounted upon the sills is the upper portion of the rack which comprises transverse members 3 which intersect the sills, are rigidly secured thereto and are provided with longitudinal strips, boards or the like to form a supporting surface for the load, as indicated at 4. In connecting together the transverse and longitudinal members at their points of intersection I utilize a series of connecting devices, the construction of which I will now describe. Each of these connecting devices comprises two connecting parts which together form what might be characterized as a two part saddle for connecting together the intersecting members. Each part of this saddle is secured to one of the intersecting members and the two parts of the saddle are provided with means for detachably connecting the same together. As shown in the drawings the connecting device comprises a plate 5 mounted upon the upper edge of the sill and provided with depending portions or flanges 6 to hold the same against lateral displacement. At diagonally opposite corners of the plate 5 are eyes or apertured lugs 7, through which extend the arms of a U-shaped clamping bolt 8, the lower ends of which are connected together by means of a tie-bar or strip 9 arranged beneath the sill 1 and through which the ends of the two arms of the clamping bolt extend. In the present instance the bolts also extend through the cross piece 2 which serves to hold the ends of the clamping bolt rigidly in place. Nuts 10 on the lower ends of the clamping bolt serve to clamp the several parts rigidly together and to permanently secure the plate 5 to the sill. The second member of the connecting device comprises a plate or bar 11 which is permanently secured to the upper one of the intersecting members. This bar may be of any suitable character and is here shown as a straight bar of comparatively narrow width secured to the under side of the upper member by means of a U-shaped clamping member 12 which extends over the upper member and has its arms arranged on either side thereof and projecting through the bar 11 where they are provided with nuts 13 to secure the plate to the upper member 3. As here shown the bars are provided with long screw-threaded portions to enable the clamp to be used upon transverse members 3 of varying heights. I also prefer to provide a shoe or metal support 14 between the upper horizontal portion of the clamping bolt and the member 3 over which it passes.

The two parts of the connecting device, which are rigidly secured respectively to the upper and lower intersecting members, are provided with means for connecting the same one to the other. Preferably, but not necessarily, they are provided with interlocking parts. In the particular form of the device here shown the plate 5 has a laterally extending portion 15 in which is formed a horizontal opening 16 of a size to receive the end of the bar 11 which projects some distance beyond the adjacent side of the upper intersecting member, as shown at 17. The apertured lug or projection 15 of the plate 5 is arranged in alinement with the projecting end of the plate 11 when the upper portion of the rack is in position upon the sills and a slight longitudinal movement of said upper portion of the rack will serve to engage or disengage the two parts, as the case may be.

Suitable means are provided for retaining the two parts of the device in their connected positions, that is, in interlocking engagement. In the present instance this means comprises a wedge or tapered pin 18 adapted to enter an opening or slot 19 in that portion of the plate 11 which passes through and extends beyond the apertured lug in the plate 5. One of these wedges may be applied to each of the several connecting devices employed in the construction of the rack, but I have found that it is only necessary to use two wedges, one on each side of the rack, the two wedges being preferably located at the same end of the rack so that they can be quickly and easily removed. I have also secured each wedge to its connecting device by means of short chains 20, thus preventing the misplacing or loss of the wedge.

While I have, in the present instance, utilized wedges for retaining the two parts of the connecting device in their connected position it will be understood that I have chosen this merely because it is a very simple and effective fastening when used in connection with the particular type of connecting plates here shown and that various other means may be used for securing together the two parts of the connecting device, the character of this means depending largely on the shape of the plates forming the connecting device. Further, it will be understood that if it is desired to interpose a metal support between the two intersecting members this can be accomplished either by lengthening the plate 5 to cause it to project beneath the upper member or by making that portion of the plate 11 which is secured to the transverse member 3 of sufficient width to extend between the two plates.

These modifications can be made without in any way affecting the present invention and as they are not a part of it they have not been here illustrated.

While I have shown and described one embodiment of my invention it will be understood that this has been chosen for the purposes of illustration only and that I do not desire to be limited to the details of construction shown and described, for obvious modifications will occur to a person skilled in the art.

Having thus fully described my invention, what I claim as new and desire to secure by Letters Patent, is:—

1. In a hay rack, the combination, with intersecting beams, of a saddle to connect said beams, said saddle comprising two separable parts, U-shaped clips extending about the respective beams to connect the two parts of said saddle thereto, one of said parts being secured to the upper edge of the lower beam and the other of said parts to the lower edge of the upper beam, that part of said saddle which is secured to the lower beam having a laterally projecting portion provided with an aperture extending lengthwise of the beam and that portion of said saddle secured to the upper beam having a portion projecting beyond the side of said beam and adapted to enter said aperture, and means to retain said portion of said last-mentioned part in said aperture.

2. In a hay rack, the combination, with intersecting beams, of a saddle to connect said beams one to the other, said saddle comprising a plate supported on the upper edge of the lower beam and having a portion extending beyond the side of said beam and provided with an aperture, a U-shaped bolt extending about said plate and said beam to secure the former to the latter, said saddle also comprising an elongated plate arranged transversely to the upper beam, a U-shaped bolt extending about said upper beam for securing said plate thereto, said plate having a portion projecting beyond the side of said beam and arranged to enter said apertured portion of the first-mentioned plate when the two parts of said saddle have been brought into their normal relative positions, and means for retaining said plates in such positions.

In testimony whereof I affix my signature in presence of two witnesses.

PHILIP A. MYERS.

Witnesses:
T. B. KELLOGG,
R. M. TUBBS.